(12) United States Patent
Hebert et al.

(10) Patent No.: US 12,516,757 B2
(45) Date of Patent: Jan. 6, 2026

(54) THREAD CONNECTOR LOCK

(71) Applicant: Frank's International, LLC, Houston, TX (US)

(72) Inventors: Joshua Hebert, Breaux Bridge, LA (US); Matthew Manuel, Lafayette, LA (US); Brennan Domec, Sunset, LA (US); Charles M. Webre, Lafayette, LA (US)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 7 days.

(21) Appl. No.: 18/358,075

(22) Filed: Jul. 25, 2023

(65) Prior Publication Data
US 2024/0027001 A1 Jan. 25, 2024

Related U.S. Application Data

(60) Provisional application No. 63/369,289, filed on Jul. 25, 2022.

(51) Int. Cl.
| | |
|---|---|
| *F16L 15/08* | (2006.01) |
| *E21B 17/043* | (2006.01) |
| *F16L 19/00* | (2006.01) |

(52) U.S. Cl.
CPC .......... *F16L 15/08* (2013.01); *F16L 19/005* (2013.01); *E21B 17/043* (2013.01)

(58) Field of Classification Search
CPC ........ F16L 15/08; F16L 19/005; E21B 17/043
USPC ........................................................ 285/95
See application file for complete search history.

(56) References Cited

U.S. PATENT DOCUMENTS

| | | |
|---|---|---|
| 9,410,647 B2 | 8/2016 | Steen et al. |
| 9,708,865 B2 | 7/2017 | Steen et al. |
| 9,714,731 B2 * | 7/2017 | O'Dell .................. E21B 17/043 |
| 10,077,613 B2 | 9/2018 | DeBerry et al. |
| 10,077,858 B2 | 9/2018 | Pallini, Jr. et al. |
| 10,344,896 B2 * | 7/2019 | Ellisor .................... F16L 15/08 |

(Continued)

FOREIGN PATENT DOCUMENTS

WO   2014058967 A2   4/2014

OTHER PUBLICATIONS

International Search Report and Written Opinion dated Nov. 8, 2023, PCT Application No. PCT/US2023/070883, 10 pages.

*Primary Examiner* — Matthew Troutman
*Assistant Examiner* — Alexander T Rufrano
(74) *Attorney, Agent, or Firm* — MH2 Technology Law Group, LLP

(57) ABSTRACT

An apparatus includes a key disposed at least partially in a first recess in a first tubular, the key defining teeth facing in a first axial direction, a first biasing member biasing the key in the first axial direction relative to the first tubular, and a rack disposed at least partially in a second recess formed in a second tubular. The rack defines teeth that face in a second axial direction that is opposite to the first axial direction, the teeth of the rack being configured to mesh with the teeth of the key. The apparatus also includes a second biasing member engaging the rack and biasing the rack in a first circumferential direction, the rack being configured to reciprocate circumferentially relative to the second tubular by engagement with the key and the second biasing member, in response to the first tubular being rotated into connection with the second tubular.

11 Claims, 12 Drawing Sheets

(56) References Cited

U.S. PATENT DOCUMENTS

| | | |
|---|---|---|
| 10,435,957 B2 | 10/2019 | DeBerry et al. |
| 10,473,132 B2 * | 11/2019 | Westgarth ................. F16B 7/18 |
| 10,597,950 B2 * | 3/2020 | McGowan ............. F16L 15/06 |
| 10,612,319 B2 * | 4/2020 | Nelson .................... F16L 15/08 |
| 2014/0167408 A1 | 6/2014 | Steen et al. |
| 2015/0337651 A1 | 11/2015 | Prammer |
| 2016/0369920 A1 * | 12/2016 | Pallini, Jr. ............... E21B 17/08 |
| 2018/0230758 A1 | 8/2018 | Nelson et al. |
| 2021/0062604 A1 | 3/2021 | Monjure et al. |

* cited by examiner

THREAD CONNECTOR LOCK

CROSS-REFERENCE TO RELATED APPLICATIONS

This application claims priority to U.S. Provisional Patent Application having Ser. No. 63/369,289, which was filed on Jul. 25, 2022 and is incorporated herein by reference in its entirety.

BACKGROUND

When drilling and/or completing a well, oilfield tubulars, such as casing, are connected together end-to-end to extend the string of tubulars deployed into the well. To make these connections, the tubulars are typically provided with threads on their axial ends. Generally, one side, referred to as the box end, has female threads and another, the pin end, has male threads. The box end can also be provided by a separate collar that is threaded onto a tubular that has both sides formed with external threads.

Oilfield tubulars undergo harsh stresses in the well, including twisting and bending among others. It is important, however, that the connections not "back out" or otherwise become loose. One way this is prevented is by preloading the connection; that is, an additional amount of torque is applied after the threads are fully meshed, such that mechanical interference resists relative movement of the tubulars. However, back out remains an issue, and sometimes additional "anti-rotation" devices (thread locks) are used to prevent such reverse rotation.

Various types of such anti-rotation devices have been proposed. They generally rely on the engagement of teeth on mating components to prevent backout. However, the use of anti-rotation devices in oilfield tubulars presents several challenges. For example, potentially hundreds of these anti-rotation devices may be called for, and the tubulars may generally not all be the same diameter. Thus expense, installation time, and keeping vast inventories of anti-rotation device components can be a challenge. Further, the precise relative angular locations of the threaded pin and box connections at full makeup, i.e., preload, may be difficult to know and/or control given machining tolerances. As such, the teeth elements of the anti-rotation mechanisms are typically not fully engaged at the final makeup, i.e., full preload, position of the connection. The less than full depth engagement of the teeth of the anti-rotation mechanism components compromises the effectiveness of the anti-rotation mechanism. Less than full depth of tooth engagement allows a threaded connection to back out slightly until the teeth of the anti-rotation mechanism are fully engaged. The amount of connection backout may be sufficient to allow the connection torsional preload to be relaxed, thereby compromising the structural integrity of the threaded connection. Another consequence of less than full depth tooth engagement occurs when the moveable elements of the anti-rotation mechanism become seized. In such cases where subsequent external forces create a tendency for the threaded connection to back out, the less than full depth engagement of the anti-rotation mechanism components results in a diminished structural load capacity of the anti-rotation device. The diminished structural load capacity of the anti-rotation device lessens the torque required to overcome the anti-rotation device thus making the connection more vulnerable to undesirable back-out.

SUMMARY

Embodiments of the disclosure include an apparatus that includes a key disposed at least partially in a first recess formed in a first tubular, the key defining teeth that face in a first axial direction, a first biasing member engaging the key and biasing the key in the first axial direction relative to the first tubular, a rack configured to be disposed at least partially in a second recess formed in a second tubular, the rack defining teeth that face in a second axial direction that is opposite to the first axial direction, the teeth of the rack being configured to mesh with the teeth of the key, and a second biasing member engaging the rack and biasing the rack in a first circumferential direction, the rack being configured to reciprocate circumferentially relative to the second tubular by engagement with the key and the second biasing member and in response to the first tubular being rotated into connection with the second tubular.

Embodiments of the disclosure also include an apparatus for securing a connection between two tubulars, the apparatus including a key disposed at least partially in a first recess formed in a first tubular, the key being arcuate in shape, and the key including retention tabs that fit into slots formed in the first recess, such that the key is configured to slide relative to the first tubular, the retention tabs being smaller than the respective slots into which the retention tabs are received, a profiled back side that permits the key to rotate about an axial direction of the first tubular when the key is disposed in the first recess, and teeth that face in a first axial direction. The apparatus also includes a biasing member engaging the key and the first tubular, the biasing member being configured to biasing the key in the first axial direction relative to the first tubular, and a rack configured disposed at least partially in a second recess formed in a second tubular. The rack defines teeth that face in a second axial direction that is opposite to the first axial direction, the teeth of the rack being configured to mesh with the teeth of the key when the first tubular is rotated into connection with the second tubular.

The foregoing summary is intended merely to introduce a subset of the features more fully described of the following detailed description. Accordingly, this summary should not be considered limiting.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

Figure 1A:
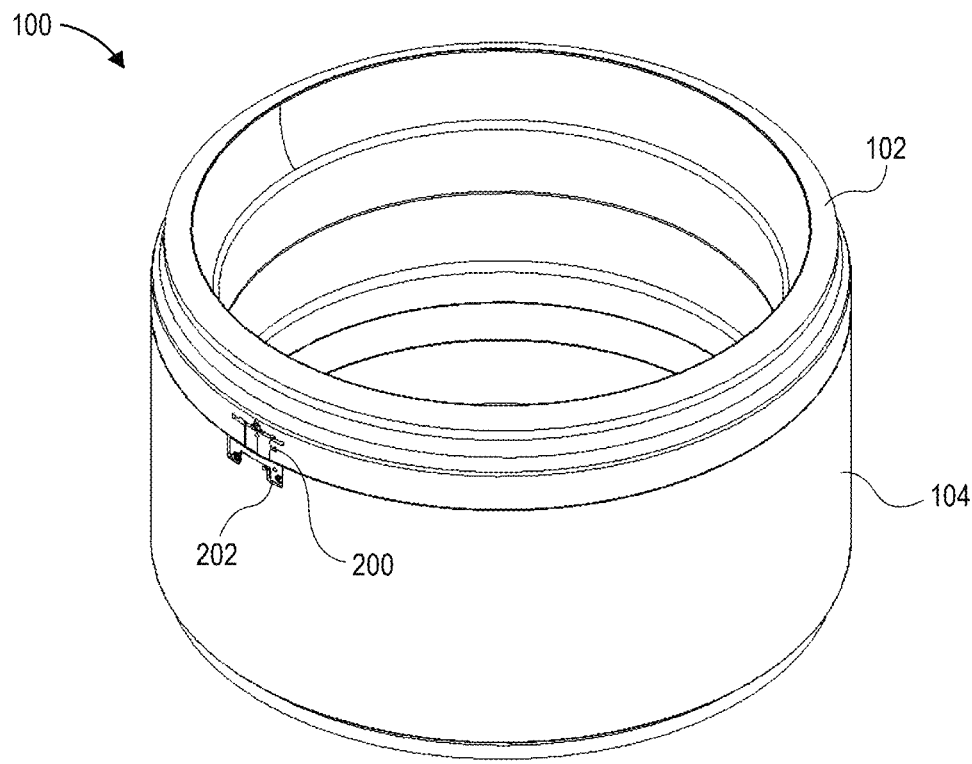
FIGS. 1A and 1B illustrate a threaded connection between a first tubular and a second tubular, including an apparatus that is configured to prevent back out of the connection once the connection is fully made up, according to at least one embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. The following description is merely a representative example of such teachings.

Figure 1B:
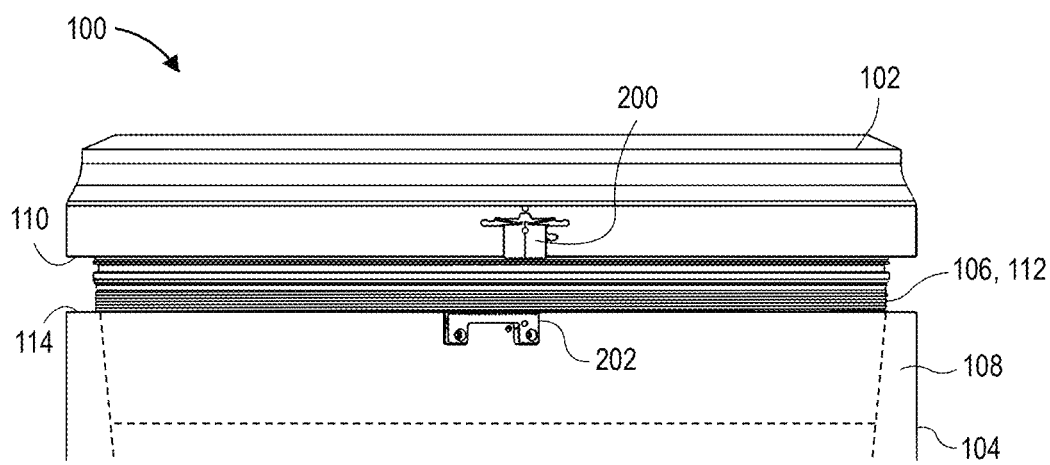

FIGS. 1A and 1B illustrate a threaded connection 100 between a first tubular 102 and a second tubular 104, according to an embodiment. In particular, the first tubular 102 includes a pin end 106 and the second tubular 104 includes a box end 108. The pin end 106 is threaded into the box end 108. Such threading may proceed by rotating the first tubular 102, e.g., using tongs, relative to the second tubular 104, as the second tubular 104 may be restrained from rotation, e.g., by engagement with a spider, back-up tongs, or other rig equipment. In some embodiments, the second tubular 104 could also or instead be rotated. Thus, although embodiments are generally described herein with the first tubular 102 rotating, it will be appreciated that "relative rotation" between the first and second tubulars 102, 104 means that either or both of the first and/or second tubulars 102, 104 may be rotated by rig equipment.

Figure 4:
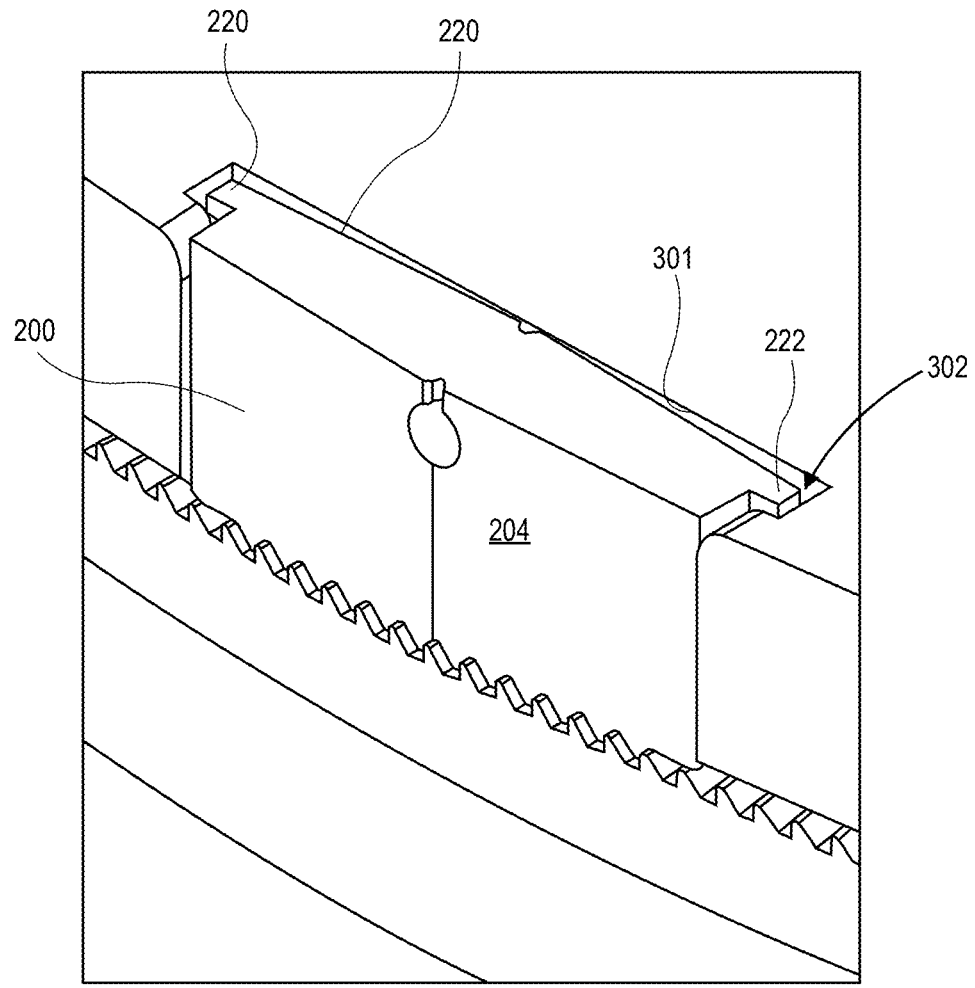
FIG. 4 illustrates a sectional view of the key positioned in the recess, according to the first embodiment.

An apparatus is also provided that is configured to prevent the first tubular 102 and the second tubular 104, once fully made-up and torqued, from backing out of connection with one another. This may also be referred to as an "anti-rotation" apparatus or thread lock device. The apparatus may include a key 200 and a rack 202, which may engage with one another so as to prevent such reverse rotation back-out. The key 200 and the rack 202 may be embedded within the first and second tubulars 102, 104, respectively, e.g., within recessed formed therein, as will be described in greater detail below. The recesses may be formed in an outer diameter surface of the first and second tubulars, respectively, to facilitate insertion of the key 200 and the rack 202 during or prior to making up the first and second tubulars 102, 104. Further, the key 200 and the rack 202 may axially engage one another, as shown in FIG. 4 (discussed below), e.g., rather than radially. That is, in at least some embodiments, the key 200 and or the rack 202 may have teeth or other meshing structures that extend radially inwards.

In a specific embodiment, the first tubular 102 may include a shoulder 110 that extends radially outward of pin threads 112 of the first tubular 102. The key 200 may be positioned in the shoulder 110. Similarly, the second tubular 104 may include a shoulder 114, which may be formed at its axial end, and the rack 202 may be positioned in the shoulder 114. It will be appreciated that, in some embodiments, the key 200 may be in the box end 108 and the rack 202 may be in the pin end 106, e.g., opposite to the illustration.

Figure 2:
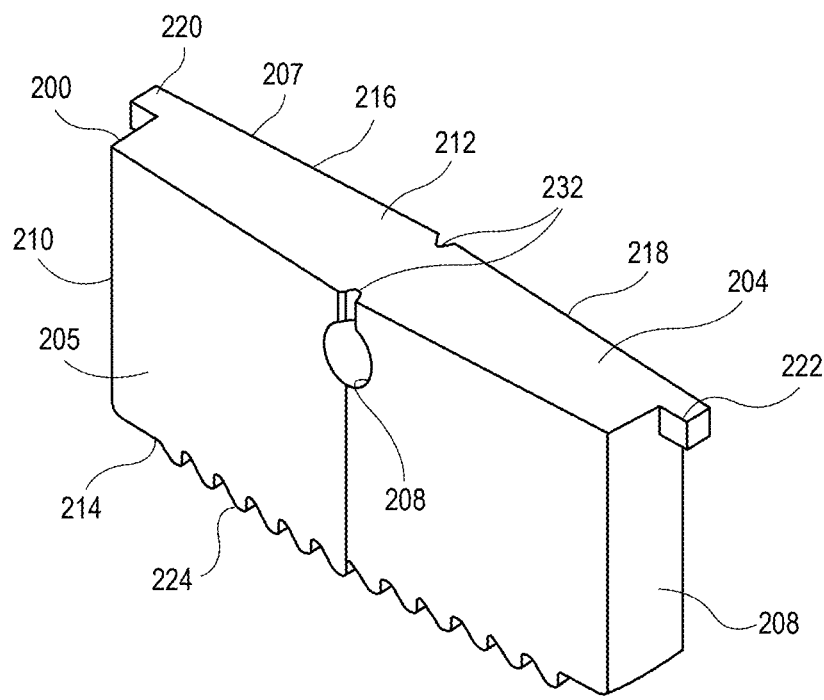
FIG. 2 illustrates a perspective view of a key of the apparatus, according to a first embodiment.

FIG. 2 illustrates a perspective view of the key 200, according to a first embodiment. The key 200 may include a main body 204 that has a front side 205, a back side 207, a first end 208, a second end 210, a top 212, and a bottom 214. The main body 204 may be arcuate in some embodiments, defining a radius of curvature from the first end 208 to the second end 210 that generally matches the radius at the outer diameter of the tubulars 102, 104. A range of sizes of tubulars 102, 104 may be employed, but the outer diameters thereof may be relatively large as compared to the width of the main body 204 (end 208 to end 210), and thus the radius of curvature may be generally compliant with the range of sizes.

Further, the main body 204 may be provided with one or more features that promote general applicability thereof across a range of tubular 102, 104 sizes, as will be described in greater detail below. For example, the front side 205 and the back side 207 may be flat, or may, as shown, be tapered or otherwise profiled (e.g., curved). In a specific embodiment, the back side 207 may include reverse tapered surfaces 216, 218, which extend toward each other at the lateral middle of the body 204, such that a thickness (front side 205 to back side 207) is smallest at the ends 208, 210, and largest at or proximal to the lateral middle. The front side 205 may be similarly tapered. The tapering of the front side 205 and/or back side 207 may permit the key 200 to rotate across range of angular orientations about an axis that is parallel to the central axis of the first tubular 102, when the key 200 is installed therein. This may permit the key 200 to find an orientation suitable for the specific tubular diameters being used.

In an embodiment, the key 200 may also include retention tabs 220, 222, which may extend laterally from the main body 204 at either end 208, 210. For example, the two retention tabs 220, 222 may be positioned proximal to the top 212 of the key 200, and may be relatively small in height, as compared to the overall height of the key 200 (top 212 to bottom 214). The thickness of the retention tabs 220, 222 may be less than a thickness of the main body 204 (front side 205 to back side 207). The retention tabs 220, 222 may be offset from the front side 205 and aligned with the back side 207. The key 200 may also include teeth 224, which may be positioned at the bottom 214, such that the teeth 224 are configured to face in an axial direction, toward the second tubular 104, when installed into the first tubular 102.

In at least some embodiments, one or both of the surface (s) 208, 210 of the key 200 may be textured to increase friction and resist upward movement of the key 200 relative to the recess 300. The texture may include, for example, knurling, ridges, grooves, or any other suitable pattern or configuration. The addition of such texture may enhance the gripping capability between the key 200 and the recess 300, which may ensure a more secure and stable connection. By increasing the frictional forces, the textured surface 210 may reduce the likelihood of axial movement of the key 200 in the recess 300, thereby maintaining a high degree of tooth engagement with the rack 202, even under significant break-out torque. In some embodiments, either or both of the surfaces of the recess 300 that face the surfaces 208, 210 of the key 200 may instead be textured, or the surfaces of the recess 300 and the surfaces 208, 210 may be textured.

The key 200, as illustrated, further includes an installation hole 230 and one or more notches (two shown) 232. The installation hole 230 may extend at least partially from the front side 205 to the back side 207, and may intersect at least one of the notches 232. The notches 232 may be formed in the front side 205 and the back side 207, and may be configured to receive a spring, or another installation structure, as will be described in greater detail below. The installation hole 230 may be configured to receive a tip of an installation tool, e.g., pliers, to facilitate installation and/or removal of the key 200 in the tubular 102. For example, the installation hole 230 may permit the pliers to draw the key 200 upwards with respect to the tubular 102 and compress a spring, temporarily, to insert or remove the key 200.

Figure 3:
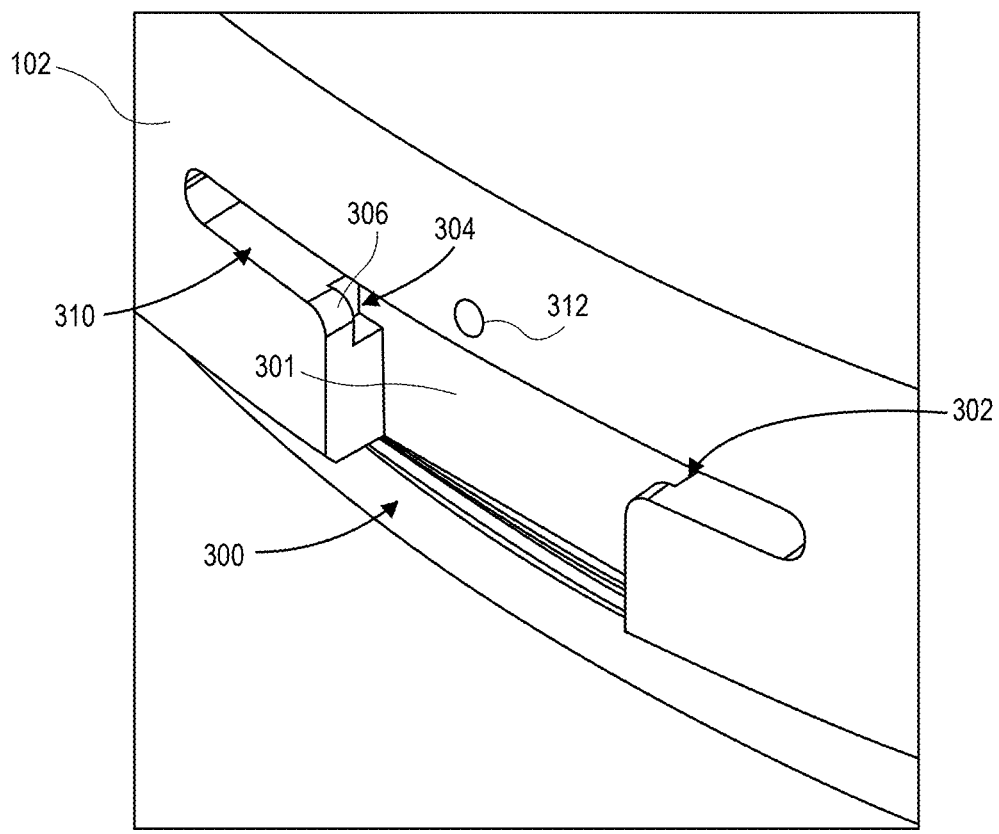
FIG. 3 illustrates a recess formed in the first tubular for receiving the key, according to the first embodiment.

FIG. 3 illustrates a recess 300 formed in the first tubular 102, according to an embodiment. The recess 300 is generally configured to receive the key 200 therein, e.g., by installing the key 200 into the recess 300 in a radial direction, inwards, and then allowing the key 200 to move axially downwards therein. The recess 300 defines a back surface 301 and keyways 302, 304, into which the key 200 is retained. The back surface 301 may be arcuate, e.g., following the curvature of the outer diameter of the first tubular 102. The end faces 208 and 210 of the key 200 may generally limit the circumferential motion of the key 200 relative to the first tubular 102. Thus, the key 200 may be prevented from circumferential movement within the recess 300, while being permitted to move linearly in the axial direction.

The retention keyways 302, 304 may be wider than the retention tabs 220, 222, so as to permit the rotation of the key 200 in the recess 300, e.g., to permit use of the key 200 across a range of tubular diameters, as discussed above and to permit the axial movement of the key 200 while restraining the key 200 within the recess 300.

The recess 300 may also include a spring section 310, which may extend circumferentially farther than the keyways 302, 304, and may be positioned above the keyways 302, 304. Further, the recess 300 may be open at its bottom. Additionally, the recess 300 may include a hole 312, which may provide a complementary engaging structure to the hole 230, e.g., to receive the tip of another end of a pair of pliers, so that the key 200 may be forced upwards in the recess 300 by closing the pliers. In some embodiments, the spring section 310 may include an overhang or ledge, which may serve to retain a spring (or other biasing member) in the spring section 310.

FIG. 4 illustrates a sectional view of the key 200 positioned in the recess 300. As shown, the main body 204 is positioned such that the retention tabs 220, 222 are in the retention keyways 302, 304. As can also be seen, the retention tabs 220, 222 are smaller than the retention keyways 302, 304, and the back side 207 of the key 200 is tapered, such that it does not precisely follow the curvature of the back side 201 of the recess 300. The tapering of the back side 207 of the key 200, and sizing of the retention tabs 220, 222 relative to the retention keyways 302, 304 permits the key 200 to rotate (shift) about an axis that is parallel to the central axis of the first tubular 102, as mentioned above. This permits the key 200 to find alignment without precisely following the diameter of the back surface 301, since the key 200 may be employed in a range of different sizes of tubulars 102.

Figure 5:
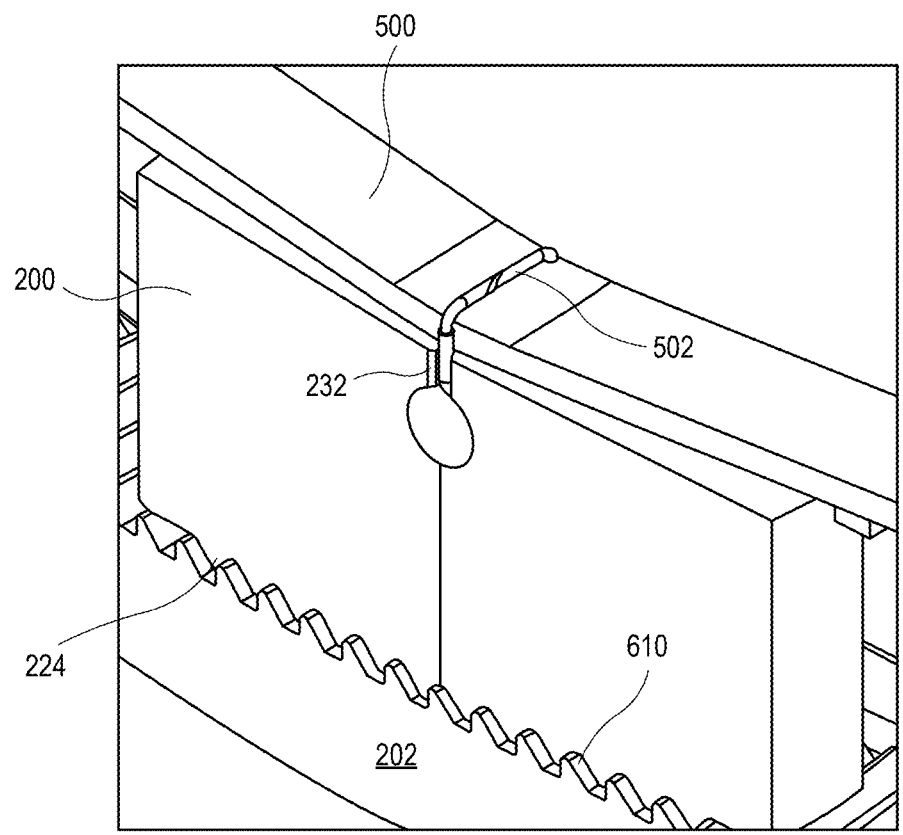
FIG. 5 illustrates a perspective view of the key engaging a biasing member, according to the first embodiment.

FIG. 5 illustrates a perspective view of the key 200 engaging a biasing member 500, according to an embodiment. Referring again additionally to FIG. 3, the biasing member 500 may be a leaf spring, and may be configured to fit into and be retained within the spring section 310 (e.g., FIG. 3) of the recess 300. Further, a retention clip 502, which may be generally U-shaped, may secure the biasing member 500 at its middle to the key 200. The retention clip 502 may, for example, be received into the notches 232, so as to maintain the position of the biasing member 500 relative to the key 200. The biasing member 500 may thus bias the key 200 in an axial direction, e.g., downward in the recess 300, such that the teeth 224 are pressed downward into engagement with the rack 202, as will be described in greater detail below.

Figure 6:
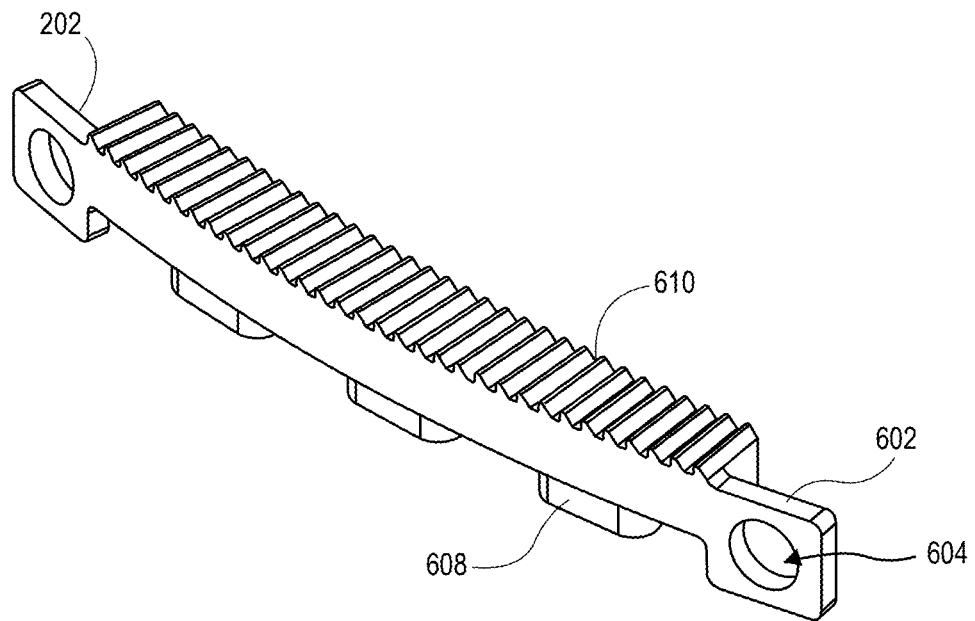
FIG. 6 illustrates a perspective view of the rack, according to the first embodiment.
Figure 7:
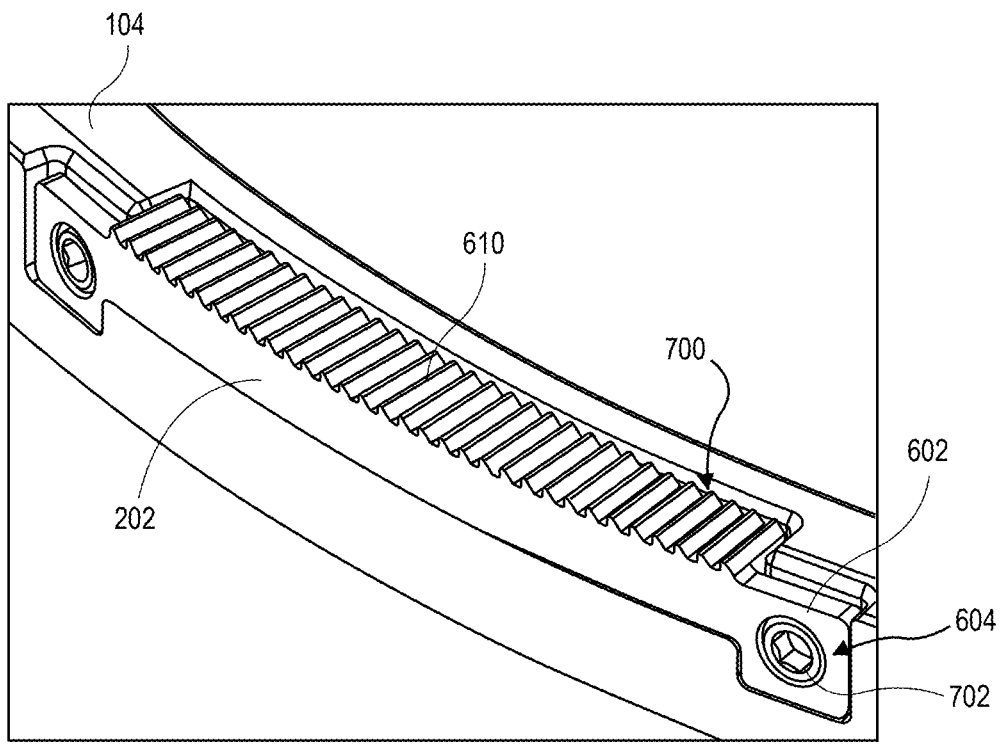
FIG. 7 illustrates a perspective view of the rack received into a recess formed in the second tubular, according to the first embodiment.

FIG. 6 illustrates a perspective view of the rack 202, according to a first embodiment. FIG. 7 illustrates a perspective view of the rack 202 received into a recess 700 formed in the second tubular 104, according to the first embodiment. Referring to both FIGS. 6 and 7, as shown, the rack 202 may be generally arcuate in shape, and may include a main body 600 and ears 602 extending laterally therefrom. The ears 602 may each have a hole 604 therethrough for receiving a bolt 702 (FIG. 7), so as to secure the rack 202 to the second tubular 104. The rack 202 may also include lugs 608 that extend therefrom and are received into complementary holes (not visible) in the second tubular 104, thereby providing increased structural resistance to movement of the rack 202 in a circumferential direction relative to the second tubular 104. The recess 700 may be sized to snugly receive the rack 202, and the rack may be stationary, in this embodiment, with respect thereto, so as to transmit forces incident on the rack 202 directly to the second tubular 104. Accordingly, when installed, the rack 202 may not be able to move relative to the second tubular 104. The rack 202 also includes upwardly-facing teeth 610 that are shaped to engage the teeth 224 of the key 200. Accordingly, the teeth 610 face in the opposite axial direction as the teeth 224, such that the two sets of teeth 610, 224 are configured to mesh together during connection of the first and second tubulars 102, 104.

Referring back to FIG. 5, for example, the teeth 224 of the key 200 are shown engaged with the teeth 610 of the rack 202. Further, as can be seen, the teeth 224 and 610 are both saw-tooth in shape, such that there is a tapered flank and a generally vertical flank on opposing sides of each tooth of both sets of teeth 224, 610. Specifically, when the key 200 rotates in the connection makeup direction relative to the rack 202, the tapered flanks of the teeth 224, 610 engage in a manner which forces the key 200 upward against the biasing member 500, until the tapered flanks no longer engage and the key 200 drops back toward the rack 202 and the next set of tapered flanks engage one another. This permits continued rotation, as the key 200 reciprocates up and down vertically. By contrast, the flat tooth flanks block connection rotation in the reverse direction, as there is no wedging force generated by the engagement of the flat flanks. Thus, referring again to FIG. 1A, once secured, the flat flank-to-flank engagement of the teeth 224, 610 of the key 200 and the rack 202 resist reverse rotation of the first tubular 102 and the second tubular 104, thereby preventing back-out of the connection therebetween.

Figure 8:
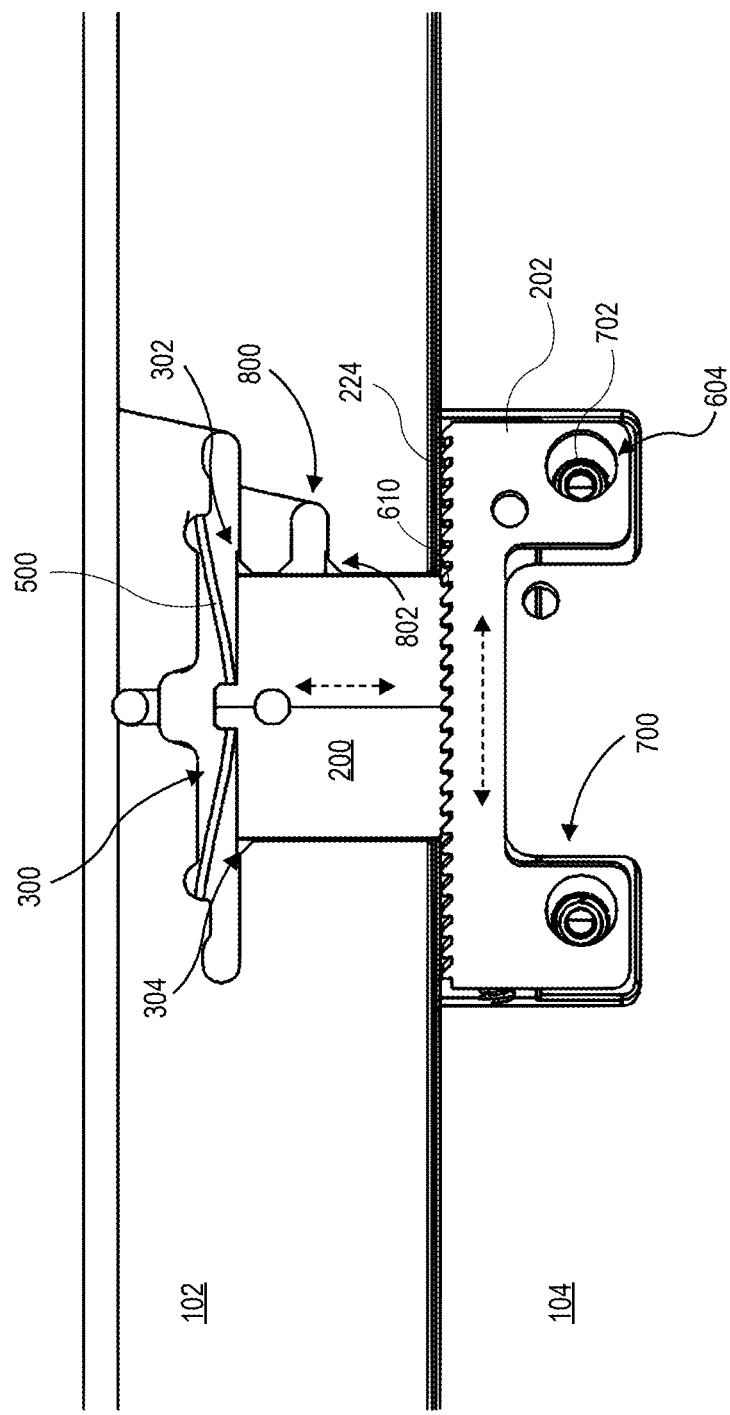
FIG. 8 illustrates a side view of the apparatus, including the key and the rack positioned within slots of the first tubular and the second tubular, respectively, according to a second embodiment.

FIG. 8 illustrates a side view of another embodiment of the anti-rotation apparatus, including the key 200 and the rack 202 positioned within recesses 300 and 700 of the first tubular 102 and the second tubular 104, respectively. Many of the elements of this embodiment may be similar to those of the prior embodiments, and similar structures are consistently numbered, where convenient to further an understanding of the present embodiments. Moreover, many of the features of the embodiments disclosed herein may be combined.

As with the prior illustrated embodiment, the key 200 reciprocates vertically (axially with respect to the first tubular 102) as the first tubular 102 is rotated into connection with the second tubular 104, caused by the interaction of the teeth 224 with the teeth 610. This is schematically indicated by the vertical arrow in the figure. However, as indicated by dashed, horizontal arrow, in this embodiment, the rack 202 may also reciprocate, but in a generally circumferential (or lateral, left-to-right in this view) motion as the first tubular 102 rotates into connection with the second tubular 104, again caused at least partially by the interaction of the teeth 224, 610.

Figure 9:
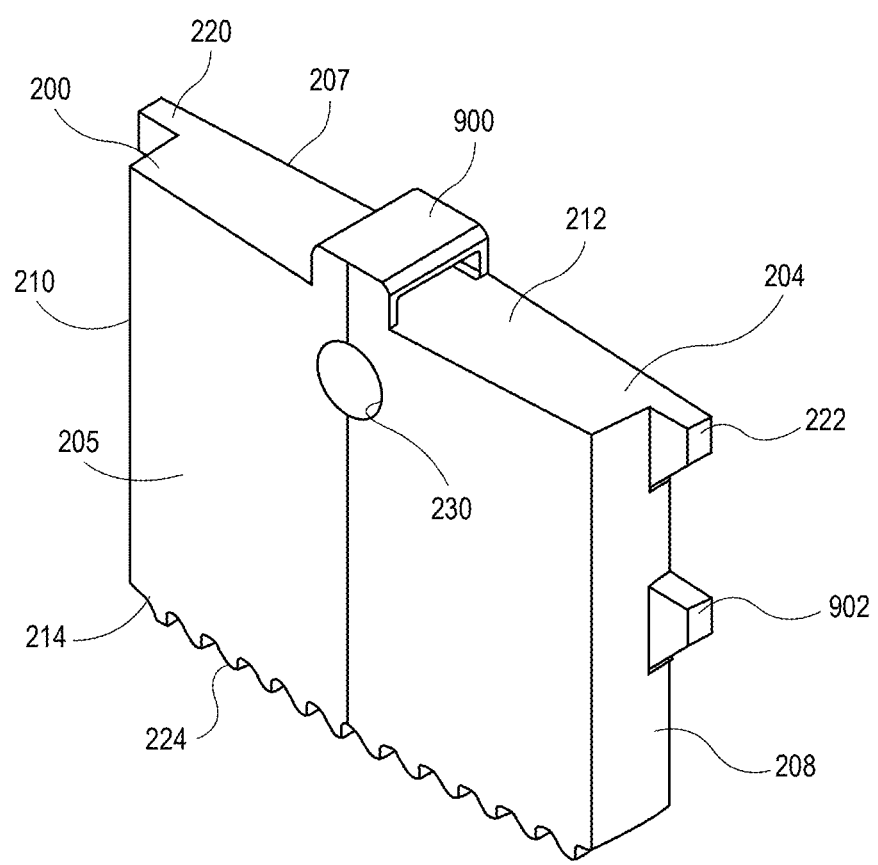
FIG. 9 illustrates a perspective view of the key, according to the second embodiment.

FIG. 9 illustrates a perspective view of the key 200, according to the second embodiment. Referring to FIGS. 8 and 9, the key 200 includes the main body 204 having the front side 205, the back side 207, the first end 208, the second end 210, the top 212, and the bottom 214 where the teeth 224 are defined. Moreover, the main body 204 may be arcuate, and the front side 205 and/or back side 207 may again be tapered, as discussed above. The key 200 may also include the retention tabs 220, 222, extending laterally from the main body 204 at either end 208, 210, and positioned proximal to the top 212 of the key 200. The key 200, as illustrated, further includes the installation hole 230 to facilitate installation.

Additionally, the key 200 includes a spring retainer 900 extending from the top 212. The biasing member 500 may slide through the spring retainer 900, providing an integral and secure connection therebetween. Further, the key 200 may include a secondary retention tab 902. The secondary retention tab 902 may be offset from the top 212 and bottom 214, e.g., positioned generally proximal to the middle of the end 208, but again aligned with the back side 207. The secondary retention tab 902 may fit into a secondary recess portion 800 (FIG. 8) of the recess 300. The secondary recess portion 800 may include an opening 802 positioned to receive the secondary retention tab 902 therein during installation of the key, e.g., proximal the axial middle of the keyway 302. The secondary retention tab 902 is captured within but freely moves axially within the vertical retention slot 302, and the secondary retention tab 902 may further prevent the key 200 from unintentionally rotating out of the recess 300 during use (e.g., preventing the bottom 214 from becoming dislodged from the recess 300). That is, the secondary retention tab 902 may be received radially into the recess 700 and then moved axially downward such that it is received into the retention slot 302, similar to the retention tabs 220, 222 being received into the respective retention slots 302, 304.

In some embodiments, threaded holes may also be provided within the recess 300 and/or the recess 700. Such threaded holes may provide compatibility with conventional anti-rotation key assemblies that require fastening with bolts. This feature allows for interchangeability and ease of use.

Figure 10:
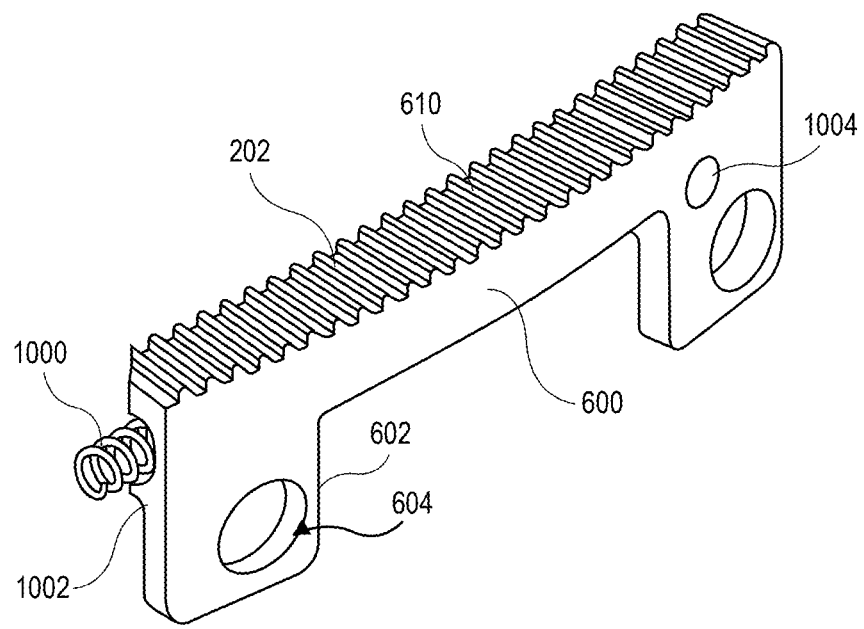
FIG. 10 illustrates a perspective view of the rack, according to the second embodiment.

FIG. 10 illustrates a perspective view of the rack 202, according to the second embodiment. The rack 202 in this embodiment includes the arcuate main body 600 upon which the teeth 610 are defined. The rack 202 also includes the ears 602 extending from the main body 600; however, the ears 602 may extend axially downward, in at least some embodiments, rather than circumferentially from the main body 600. The ears 602 may each have the hole 604 therethrough for receiving the bolt 702 (FIG. 8) therethrough, so as to secure the rack 202 to the second tubular 104. Referring again to FIG. 8, it can be seen that the bolt 702 in this embodiment is smaller than the hole 604. This relative sizing permits the left-to-right reciprocating motion of the rack 202 relative to recess 700 in the second tubular 104. The bolt 702 may, however, serve to prevent up-and-down (axial) motion of the rack 202, e.g., preventing the rack 202 from being dislodged from the recess 700.

The rack 202 may be spring biased in a specific direction, which covers the bolts 702 used to secure it. This spring biasing ensures that the bolts 702 are retained, potentially avoiding the bolts 702 from inadvertently falling out during operation or when subjected to external forces. The bolts 702 may provide an additional layer of safety and security to the connection 100, minimizing the risk of bolt detachment or loss.

Based on the foregoing descriptions, it can be understood that the anti-rotation device components can be pre-installed onto the respective threaded connections at any time prior to commencement of the connection makeup process.

Further, the biasing member 1000 engages the rack 202 on at least one circumferential side (e.g., side 1002). In some embodiments, the biasing member 1000 may be a helical spring, as shown, but could be provided by a leaf spring or any other biasing device. The biasing member 1000 also engages a side of the recess 700, and thereby serves to press rack 202 toward one circumferential side of the recess 700. The recess 700 is formed circumferentially larger than the rack 202, so as to permit the reciprocating movement thereof, and thus the biasing member 1000 tends to create a gap between the side 1002 and the side of the recess 700, as is seen in FIG. 8 and in FIG. 11. The rack 202 engaging the key 200 alternatingly compresses the biasing member 1000 and then is moved circumferentially by the biasing member 1000 as the teeth 610 engage the teeth 224 and then move out of engagement therewith by the vertical reciprocating motion of the key 200. As will also be described below, the biasing member 1000 moving the rack 202 combined with the biasing of the key 200 axially downward thus serves to avoid a circumstance where a desired fully connected position of the first tubular 102 relative to the second tubular 104 exists at a rotational position where the teeth 224, 610 are not fully engaged. Assuring that the teeth 224, 610 are fully engaged at the final makeup position of first and second tubulars 102 and 104 respectively results in consistent structural strength at the engagement interface between the key 200 and the rack 202. Consistent structural strength at the engagement interface provides consistent structural resistance to backout between tubular connections 102 and 104.

Figure 11:
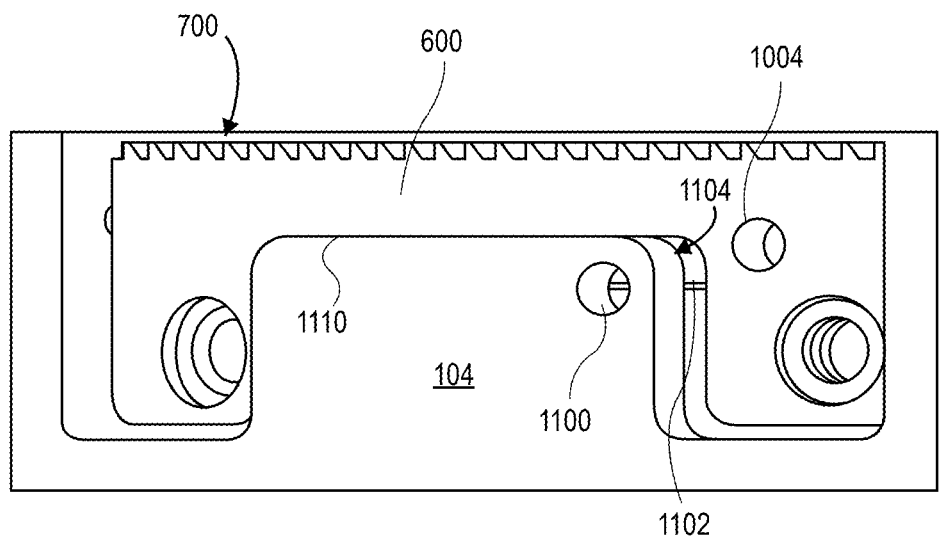
FIG. 11 illustrates a side perspective view of the rack located in the recess of the second tubular, according to the second embodiment.

Referring now additionally to FIG. 11, there is shown the rack 202, according to the second embodiment, located in the recess 700. As is visible in FIGS. 10 and 11, the rack 202 may include an installation hole 1004. A similar installation hole 1100 may be formed in the second tubular 104, proximal to the recess 700 and near to, but circumferentially offset from, where the installation hole 1004 of the rack 202 is positioned when installed. A tool, such as pliers, may be inserted into the two holes 1004, 1100 so as to compress the biasing member 1000 and permit installation of the rack 202 into the recess 700.

Further, as can be seen in FIG. 11, the rack 202 may include a retention ledge 1102, which may extend downwards from the main body 600, at least partially (e.g., entirely) between ears 602. The retention ledge 1102 may be arcuate in shape, similar to the main body 600, but may be thinner, so as to fit into a retention slot 1104 formed in the recess 700. The retention slot 1104 may likewise be arcuate, and may be larger in width (radial direction) but smaller in width (circumferential direction) than the retention ledge 1102, thereby permitting the retention ledge 1102 to slide axially down into the retention slot 1104 during installation, and then to reciprocate circumferentially during use. In at least some embodiments, the shape of the retention ledge 1102 and the retention slot 1104 may enforce the circumferential path of movement of the reciprocating movement of the rack 202. Further, a lower side of the main body 600 may engage a face 1110 of the second tubular 104, thereby preventing from the rack 202 from moving axially away from the key 200 during use. Thus, the rack 202 may be prevented from axial movement, while being permitted to move in the circumferential direction.

Figure 12:
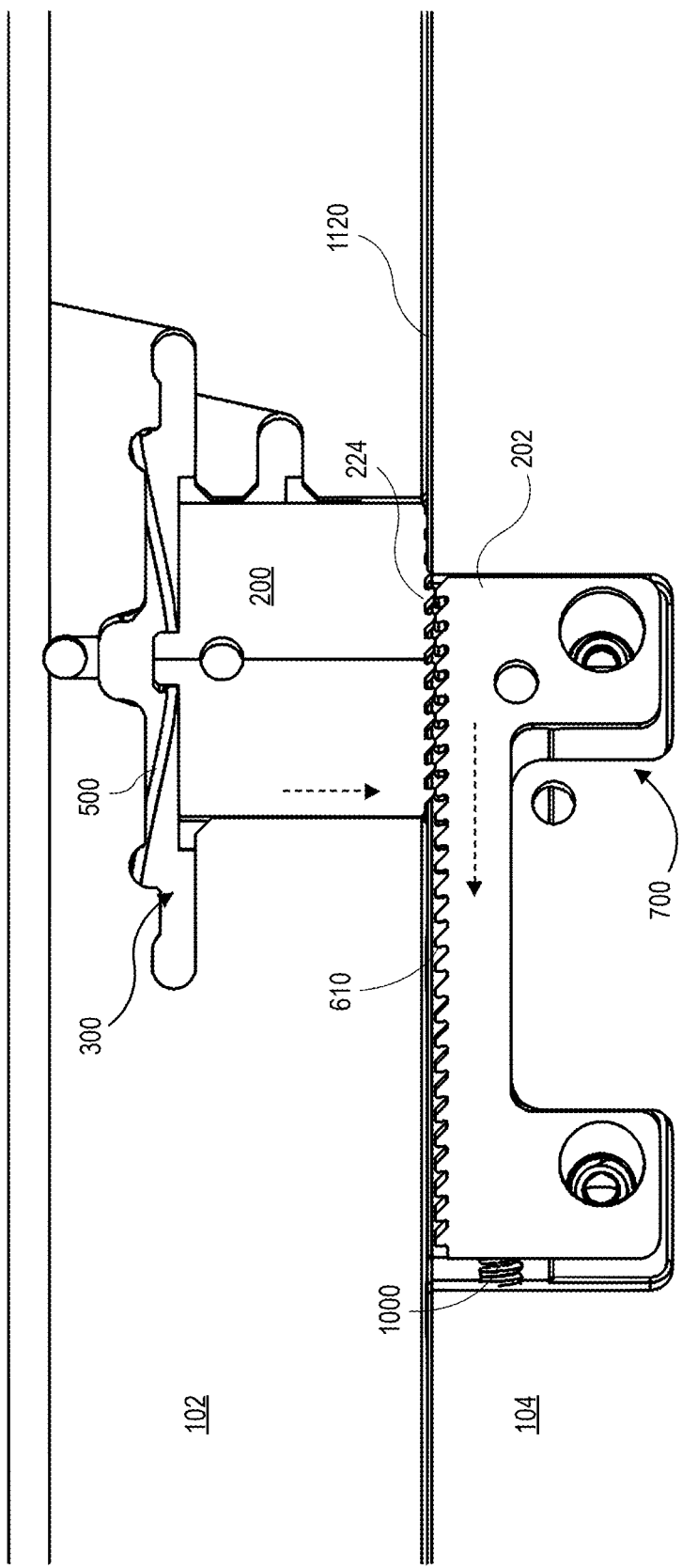
FIGS. 12 and 13 illustrate at least part of a sequence of operation of the apparatus, according to the second embodiment.
Figure 13:
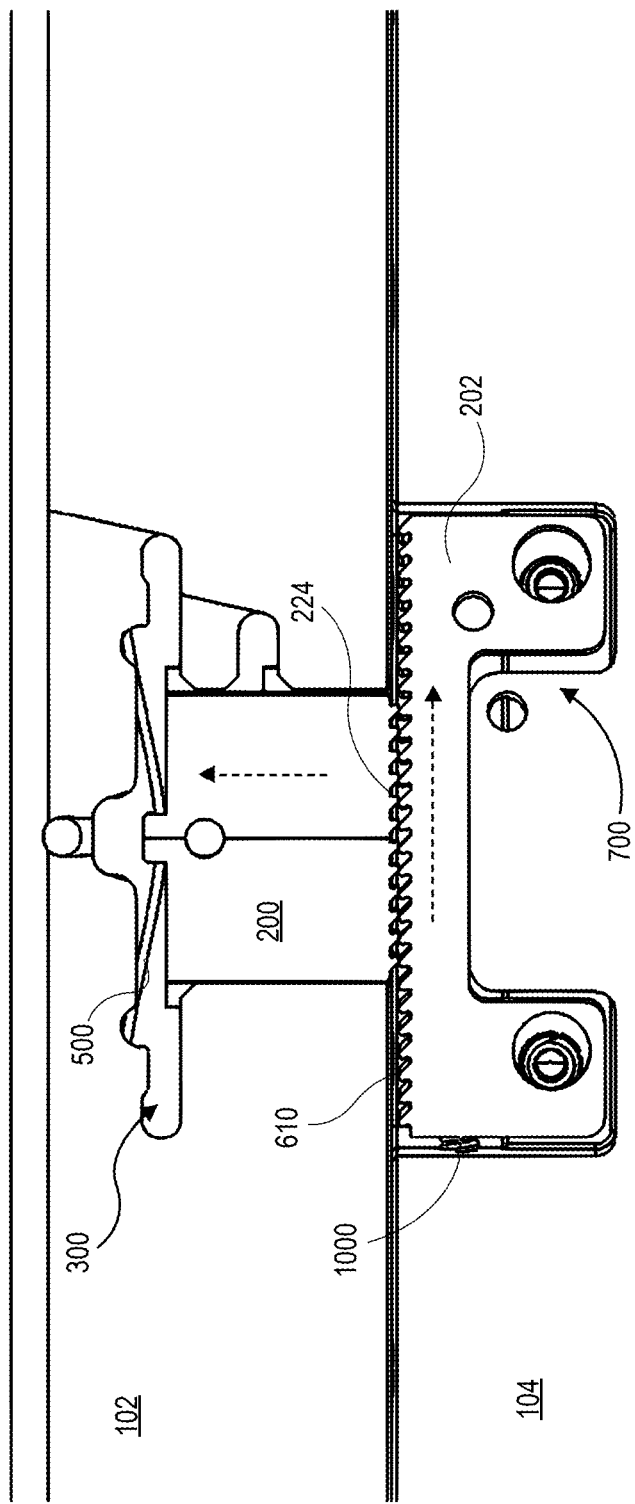

Referring now to FIGS. 8, 12, and 13, a sequence of the movement of the key 200 and the rack 202 during the final stages of a connection being made between the first and second tubulars 102, 104 can be seen. FIG. 12 depicts a first and second connection nearing the final makeup position of the threaded connection with the key and rack teeth interacting. The figure further illustrates the sequence. As shown, the rack 202 is pressed toward the right, against the wall of the recess 700. Further, the key 200, which has been on the flat surface 1120 adjacent to the recess 700 has moved successively into alignment with the recess 700. As with the prior embodiment, the tapered flanks of the teeth 610, 224 engage during the rotation. Accordingly, the key 200 may stroke downward, as indicated by the dashed arrow, such that the teeth 224, 610 mesh, as the first tubular 102 continues to rotate relative to the second tubular 104. Such engagement also moves the rack 202 toward the left, compressing the biasing member 1000, as indicated by the second dashed arrow. During this period of movement of the rack 202 toward the left, the teeth 224, 610 may stay fully engaged.

As shown in FIG. 13, eventually during this connection makeup process, the rack 202 reaches its end range of leftward (in this view) circumferential motion within recess 700, and the wedge force between the tapered flanks of the teeth 224, 610 causes the key 200 to stroke upwards, as indicated by the dashed arrow. The distal tips of the teeth 610, 224 may then engage as the key 200 seeks to jump into engagement with the next set of teeth 610. The biasing member 1000 has been compressed, as noted above, by the circumferential movement of the key 200 relative to the rack 202. At a moment just subsequent to that illustrated in FIG. 13, the circumferential force applied by the compressed biasing member 1000 overcomes remaining engaging forces between the teeth 610, 224 and shifts the rack 202 back to the right, as indicated by the dashed arrow. This permits the key 200 to drop back down relative to the rack 202, such that the teeth 224, 610 once again fully mesh, and continued rotation of the threaded connection may drive the rack 202 again circumferentially (to the left), until again the key 200 is ready to advance in the teeth 610. Because the rack 202 is permitted to reciprocate circumferentially, the configuration of FIG. 13 where the teeth are out of engagement may be avoided as the final positioning of the rack 202 and key 200, but the key 200 may instead move over a range of distance while full engagement of the teeth 224, 610 is maintained, up until the moment that the key 200 advances to the next set of teeth 610. This may avoid or at least mitigate the loss of preload discussed above, with the result being the configuration illustrated in FIG. 8 where the teeth 224 of the key 200 and the teeth 610 of the rack 202 are fully engaged. Another benefit of the threaded connection anti-rotation device described herein is that there are no manual intervention assembly steps or adjustments required once the connection makeup is complete.

Figure 14:
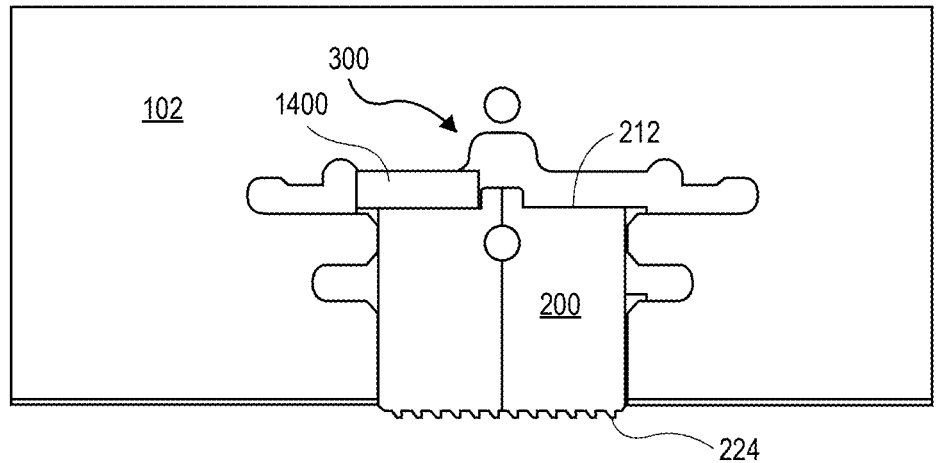
FIG. 14 illustrates a side view of another embodiment of the key.

FIG. 14 illustrates a perspective view of the key 200 inserted into the recess 300 of the tubular 102, according to another embodiment. More particularly, as shown, the key 200 fits in the recess 300 as discussed above, e.g., with reference to FIG. 8. A shim 1400, e.g., a block, may be inserted into the recess 300, e.g., between the top 212 of the key 200 and the top of the recess 300. The shim 1400 may be made of a metal, an alloy, or any other suitable material. The shim 1400 may restrict upward axial movement of the key 200, which may promote full engagement of the teeth 224 of the key 200 with the teeth 610 of the rack 202 (e.g., FIG. 8).

The shim 1400 may enhance the ability of the connection 100 to withstand breakout torque force, i.e., forces directed circumferentially on the tubular 102. For example, the shim 1400 may ensure a generally constant and complete tooth engagement between the key 200 and the rack 202 (e.g., FIG. 2), thereby reducing the risk of partial shear failure within the key 200. Consequently, the anti-rotation key may provide an increased breakout torque.

Figure 15A:
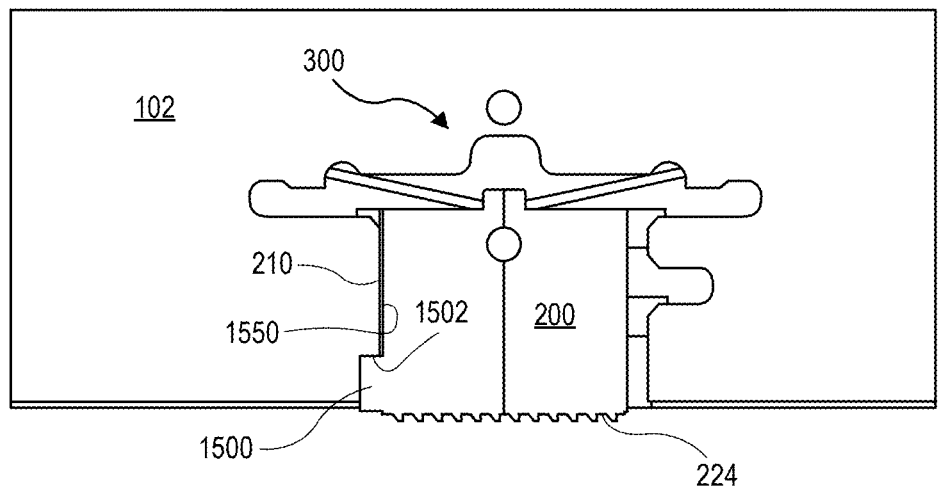
FIGS. 15A, 15B, 15C illustrate side views of three embodiments of the key.
Figure 15B:
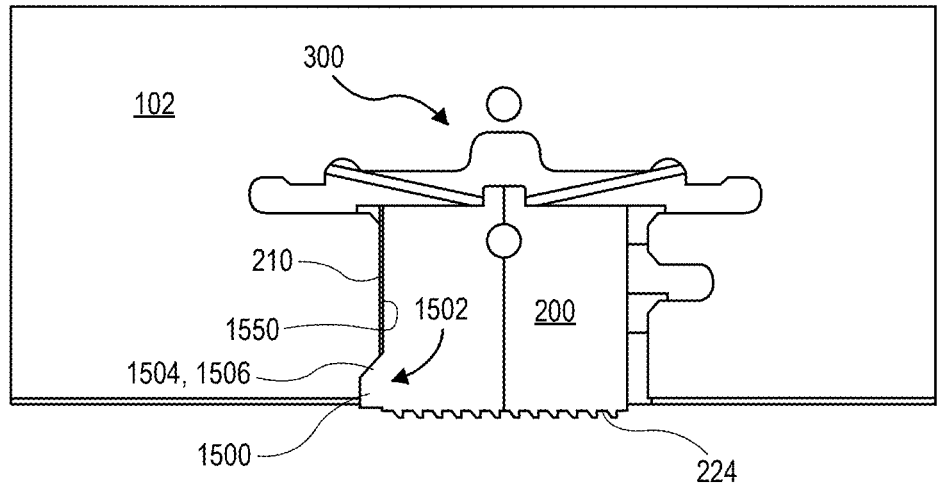

FIGS. 15A and 15B illustrate side views of two more embodiments of the key 200 in the recess 300 of the tubular 102. As shown in each of these FIGS. 15A and 15B, the lower end of the surface 210 may include a protrusion 1500, which may extend outward, laterally from the remainder of the surface 210. The recess 300 may include a complementary section 1502 in a sidewall 1550 thereof, for receiving the protrusion 1500 at least partially therein. As shown specifically in FIG. 15A, the protrusion 1500 may be generally square, or, as shown in Figure the protrusion 1500 may be tapered.

In the square protrusion 1500 embodiment of FIG. 15A, the protrusion 1500 may initially not be in the section 1502, but may slide into the section 1502 under torque forces applied to the key 200 by engagement with the rack 202 (e.g., FIG. 8). Once received into the section 1502, the protrusion 1500 may thus resist axial displacement of the key 200 away from the rack 202 (FIG. 8), such that the key 200 resists breakout rotation between the tubulars 102, 104 (e.g., FIG. 8).

In the tapered embodiment, the protrusion 1500 and the section 1502 may define first and second angled surfaces 1552, 1554, respectively, that are configured to engage one another. Circumferentially-directed force on the key 200, e.g., via engagement with the teeth 210, may wedge the tapered protrusion 1500 against the tapered section 1502, which may press the key 200 axially downward, e.g., toward the teeth 610 of the rack 202 (e.g., FIG. 8). Thus, torque in the breakout direction may serve to increase the engagement forces between the key 200 and the rack 202, such that the combination thereof serves to resist breakout rotation between the tubulars 102, 104 (e.g., FIG. 8).

Figure 15C:
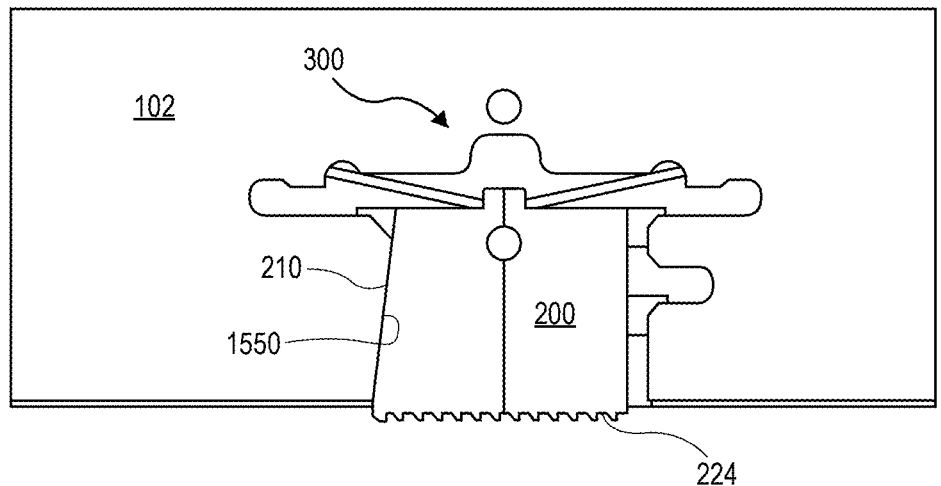

FIG. 15C illustrates a side view of another embodiment of the key 200 in the recess 300 of the tubular 102. In this embodiment, the side surface 210 is tapered (e.g., is an angled surface), as is a sidewall 1550 of the recess 300. Thus, as torque force is applied that would tend to produce a breakout of the connection 100 is applied to the key 200, the key 200 is driven further into engagement with the rack 202 via the wedging, tapered engagement between the surface 210 and the sidewall 1550.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An apparatus, comprising:
   a key disposed at least partially in a first recess formed in a first tubular, wherein the key defines teeth that face in a first axial direction, and wherein the key comprises a plurality of retention members that are configured to be received into slots of the first tubular, to retain the key in the first recess while permitting the key to reciprocate axially;
   a first biasing member engaging the key and biasing the key in the first axial direction relative to the first tubular;
   a rack configured to be disposed at least partially in a second recess formed in a second tubular, wherein the rack defines teeth that face in a second axial direction that is opposite to the first axial direction, the teeth of the rack being configured to mesh with the teeth of the key; and
   a second biasing member engaging the rack and biasing the rack in a first circumferential direction, wherein the rack is configured to reciprocate circumferentially relative to the second tubular by engagement with the key and the second biasing member and in response to the first tubular being rotated into connection with the second tubular.

2. The apparatus of claim 1, wherein the key is configured to reciprocate in the axial direction by engagement with the rack and the first biasing member in response to the first tubular being rotated into a threaded connection with the second tubular.

3. The apparatus of claim 1, wherein the key comprises a main body, and wherein the plurality of retention members extend circumferentially from the main body.

4. The apparatus of claim 3, wherein at least one of the plurality of retention members is offset from a top of the main body, and wherein at least another one of the plurality of retention members is aligned with the top of the main body.

5. The apparatus of claim 1, wherein the first biasing member comprises a spring that is connected to a top of the key and presses against the first tubular.

6. The apparatus of claim 1, wherein the rack comprises a first hole and a second hole configured to receive a first bolt and a second bolt, respectively, therethrough, the first and second holes being larger than the first and second bolts to permit the reciprocating of the rack.

7. The apparatus of claim 1, wherein the second biasing member comprises a spring that engages a side of the second recess and a side of the rack.

8. The apparatus of claim 1, wherein the rack is restrained from movement in the first and second axial directions.

9. The apparatus of claim 1, wherein the rack comprises a retention tab that fit into a retention keyway of the second recess and prevents dislocation of the rack from within the second recess, while permitting the reciprocating movement of the rack.

10. The apparatus of claim 1, wherein the rack engages a wall of the second recess on an axial side thereof, such that the rack is prevented from moving axially away from the key.

11. An apparatus, comprising:
    a key disposed at least partially in a first recess formed in a first tubular, wherein the key defines teeth that face in a first axial direction, wherein the key moves linearly in the first axial direction and is prevented from circumferential movement relative to the first tubular;
    a first biasing member engaging the key and biasing the key in the first axial direction relative to the first tubular;
    a rack configured to be disposed at least partially in a second recess formed in a second tubular, wherein the rack defines teeth that face in a second axial direction that is opposite to the first axial direction, the teeth of the rack being configured to mesh with the teeth of the key, and wherein the rack moves linearly in the circumferential direction and is prevented from axial movement; and
    a second biasing member engaging the rack and biasing the rack in a first circumferential direction, wherein the rack is configured to reciprocate circumferentially relative to the second tubular by engagement with the key and the second biasing member and in response to the first tubular being rotated into connection with the second tubular.

* * * * *